(12) United States Patent
Maier et al.

(10) Patent No.: US 6,736,104 B2
(45) Date of Patent: May 18, 2004

(54) FUEL INJECTOR

(75) Inventors: Martin Maier, Möglingen (DE);
Günter Dantes, Eberdingen (DE);
Detlef Nowak, Untergruppenbach (DE);
Jörg Heyse, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/312,377

(22) PCT Filed: Apr. 13, 2002

(86) PCT No.: PCT/DE02/01389
§ 371 (c)(1),
(2), (4) Date: Mar. 21, 2003

(87) PCT Pub. No.: WO02/088541
PCT Pub. Date: Nov. 7, 2002

(65) Prior Publication Data
US 2003/0192505 A1 Oct. 16, 2003

(30) Foreign Application Priority Data
Apr. 26, 2001 (DE) .......................... 101 20 462

(51) Int. Cl.$^7$ ................................................ F02M 61/18
(52) U.S. Cl. .................. 123/305; 239/452; 239/533.12; 123/472
(58) Field of Search ................................ 123/305, 472; 239/452, 533.12

(56) References Cited

U.S. PATENT DOCUMENTS

| | | | |
|---|---|---|---|
| 2,303,992 A | 12/1942 | Frazer et al. | |
| 3,680,792 A | * 8/1972 | Schott | 239/452 |
| 4,932,374 A | 6/1990 | Klomp et al. | 239/533.12 |
| 5,273,191 A | * 12/1993 | Meshberg | 239/452 |
| 5,716,009 A | * 2/1998 | Ogihara et al. | 239/533.12 |
| 6,019,296 A | * 2/2000 | Yamamoto et al. | 239/533.2 |
| 6,045,063 A | * 4/2000 | Koike et al. | 239/533.12 |
| 6,105,883 A | 8/2000 | Takeda et al. | 239/533.12 |
| 6,155,504 A | 12/2000 | Sugimoto et al. | 239/533.12 |
| 6,244,525 B1 | * 6/2001 | Gallup et al. | 239/533.12 |
| 6,520,165 B1 | * 2/2003 | Steele | 123/305 |

FOREIGN PATENT DOCUMENTS

| | | |
|---|---|---|
| DE | 198 47 625 | 4/1999 |
| DE | 19951014 | 1/2001 |
| EP | 0 918 157 | 5/1999 |

* cited by examiner

Primary Examiner—Erick Solis
(74) Attorney, Agent, or Firm—Kenyon & Kenyon

(57) ABSTRACT

A fuel injector, for example, a high-pressure injection valve for the direct injection of fuel into a combustion chamber of an internal combustion engine having external ignition, which is distinguished in that an outlet orifice is provided downstream from the valve seat which, at its downstream end, has a slot-forming element that largely closes off the outlet orifice. Between the outlet orifice and a front face of the valve-seat member, the slot-forming element leaves open a slot-shaped flow outlet, through which a fuel spray may be spray-discharged in a fan-jet pattern.

36 Claims, 4 Drawing Sheets

FUEL INJECTOR

FIELD OF THE INVENTION

The present invention is directed to a fuel injector.

BACKGROUND INFORMATION

A fuel injector in which a slot-shaped outlet opening is provided at the downstream end is described in German Patent Application No. 198 47 625. The outlet opening is either formed in a perforated disk or directly on the nozzle body itself. The slot-shaped outlet openings are always introduced centrally at the longitudinal valve axis. Upstream from the valve seat is a helical groove, which imparts a circular rotary motion to the fuel flowing to the valve seat. The flat outlet orifice ensures that the fuel is spray-discharged in a fanlike manner.

SUMMARY OF THE INVENTION

The fuel injector according to the present invention has fuel sprays in fan-jet form that may easily be discharged in any desired spatial direction. The slot-shaped flow outlet provides that the jet penetrates to varying degrees across the width of the fan jet. This may produce fan-type spray fronts which penetrate the combustion chamber to varying depths during direct injection. The maximally available combustion chamber cross-section may thereby be filled with fuel spray without any significant wetting of the combustion-chamber wall. The maximum air quantity may be mixed with fuel spray without any particular wall wetting.

The width of the flow outlet may be varied since the cross-sectional area of the flow outlet changes as a function of the hydraulic pressure acting on the slot-forming element and the plastic deformation of the slot-forming element in the area of the free circumferential section that it entails. The flow-rate of the valve (dynamic flow quantity) may be selectively changed and set. The dynamic range of a fuel injector is thereby able to be enlarged toward small spray-discharge quantities. Even smaller, precisely metered spray-discharge quantities may be possible in idle operation at lowered system pressure.

The pressure-controlled variation of the width of the flow outlet may also make it possible to vary the width of the fan jet, that is, the propagation angle of the jet fan. Since the slot-cross section is lenticular, the mass-flow portion at the two pointed slot ends is less than the mass flow portion in the central region of the flow outlet. If the slot width is reduced, the mass portion emerging at the two slot ends is correspondingly lower yet, so that the slot length effectively traversed by the flow is reduced in response to a reduction in the slot width. Consequently, the propagation angle of the jet fan, given a pressure drop, is likewise reduced. At low engine loads, this provides for an appropriately reduced propagation of the spray cloud in the combustion chamber, which may meet power efficiency demands.

The static flow quantity may be adjusted via the width of the flow outlet. At the end of the valve manufacturing process, the slot width is adjusted by mechanical bending of the slot-forming element.

The danger of carbon deposits forming in the flow outlet may be reduced by the pressure pulsations during valve operation, since the flow outlet "breathes", due to the constant width variation. This "breathing" mechanically removes deposits in the area of the flow outlet.

DETAILED DESCRIPTION

Figure 1:
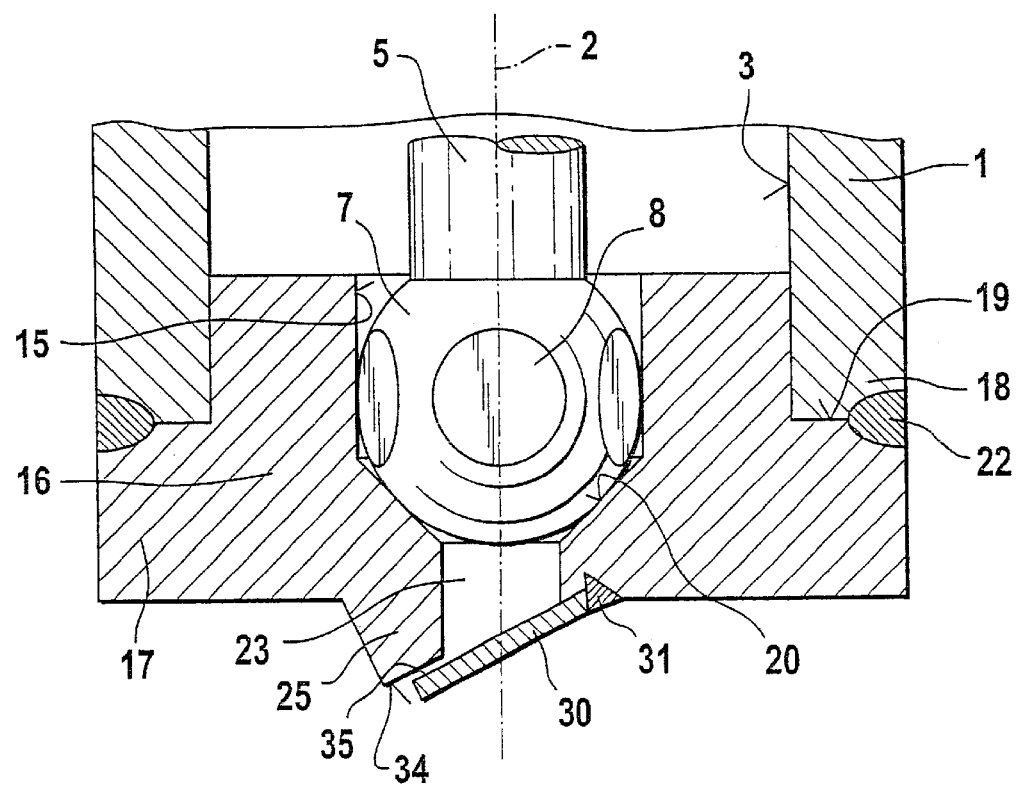
FIG. 1 shows a partial view of an example embodiment of a fuel injector having a first spray-discharge geometry in accordance with the present invention.

FIG. 1 shows a partial view of an exemplary embodiment of a valve in the form of an injector for fuel injection systems of mixture-compressing, externally ignited internal combustion engines. The fuel injector may be suitable as a high-pressure injector for the direct injection of fuel into a combustion chamber of an internal combustion engine. The injector shown in FIG. 1 has a tubular valve-seat support 1, in which a longitudinal opening 3 is formed concentrically to a longitudinal valve axis 2. Situated in longitudinal opening 3 is a, for example, rod-shaped valve needle 5, which is fixedly connected by way of its downstream end 6 to, for example, a spherical valve closure member 7, on whose periphery, for example, five flattened regions 8 are provided for the fuel to flow past.

The fuel injector may be actuated in a conventional manner, e.g., electromagnetically. The fuel injector may also be actuated by a piezoelectric actuator as an excitable actuating element, or via a piston subjected to pressure in a controlled manner. A schematically sketched electromagnetic circuit, including a magnetic coil 10, an armature 11 and a core 12 may be used for axially moving valve needle 5, and thus for opening a restoring spring against the spring tension, or for closing the fuel injector. Armature 11 may be connected to the end of valve needle 5 facing away from valve-closure member 7 by a welding seam that is formed by laser, for example, and points to core 12.

A guide opening 15 of a valve-seat member 16, which may be introduced in the downstream end 18 of valve-seat support 1 in longitudinal opening 3, is provided to guide valve-closure member 7 during the axial movement. Valve-seat member 16 may be provided, for example, with a circumferential flange 17, which extends under downstream end 18 of valve-seat support 1. Upper face 19 of circumferential flange 17 may be ground, for example, in a clamping device, with guide opening 15 and a valve-seat surface 20 provided in valve-seat member 16. Valve-seat member 16 is inserted until upper face 19 of flange 17 abuts against end 18 of valve-seat support 1. Valve-seat member 16 may be secured in the contact region of the two components 1 and 16, for example, by a welded seam 22 produced by a laser.

Formed downstream from valve-seat surface 20, which, for example, may taper frustoconically in the flow direction, is an, e.g., circular outlet orifice 23 in a valve-seat member 16, which ends in an at least partially projecting spray-discharge area 25. Outlet orifice 23 is largely closed by a slit-forming element 30 provided at its downstream end which, in the exemplary embodiments, is configured as a thin, membrane-type elliptical tongue.

Figure 2:
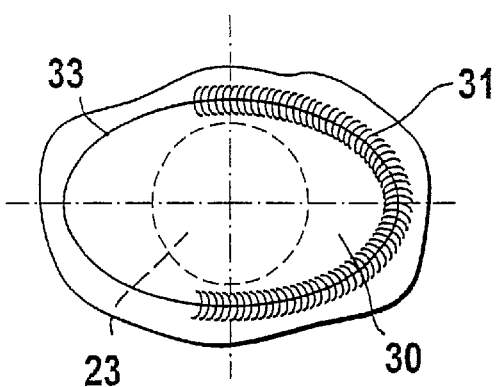
FIG. 2 shows a view from below of the slot-forming element used in the fuel injector according to FIG. 1.

Slit-forming element 30 may mounted on valve-seat member 16, for example, by way of a welded seam 31. Welded seam 31 may extend only across part of the periphery of slot-forming element 30. In FIG. 2, which shows slot-forming element 30 used in the fuel injector according to FIG. 1 in a view from below, welded seam 31 wraps around more than 50% of the circumference of slot-forming element 30. Ideally, the welded circumference amounts to between 50 and 75% of the total circumference of slot-forming element 30. The remaining part of the circumference of slot-forming element 30 is in the form of free circumferential section 33.

While in the mounting area, i.e., in the region of welded seam 31, slot-forming element 30, directly abuts closely against a lower front face 34 of spray-discharge area 25, lower front end 34, in the area of free circumferential section 33 of slot-forming element 30, may be formed such that a slight gap exists with respect to one another between lower front face 34 and slot-forming element 30. Therefore, a slot-shaped flow outlet 35 is provided across 25 to 50% of the circumference of slot-forming element 30. Slot-forming element 30, for instance, is disposed at an angle, i.e., at an angle deviating from longitudinal valve axis 2 by 90°, so that a fuel spray to be spray-discharged may likewise emerge at an angle.

The width of flow outlet 35 may be varied. That is because the cross-sectional area of flow outlet 35 changes as a function of the hydraulic pressure acting an slot-forming element 30 and the associated plastic deformation of slot-forming element 30 in the area of free circumferential section 33. In this manner, the flow rate of the valve (dynamic flow quantity) may be selectively modified and set.

Figure 3:
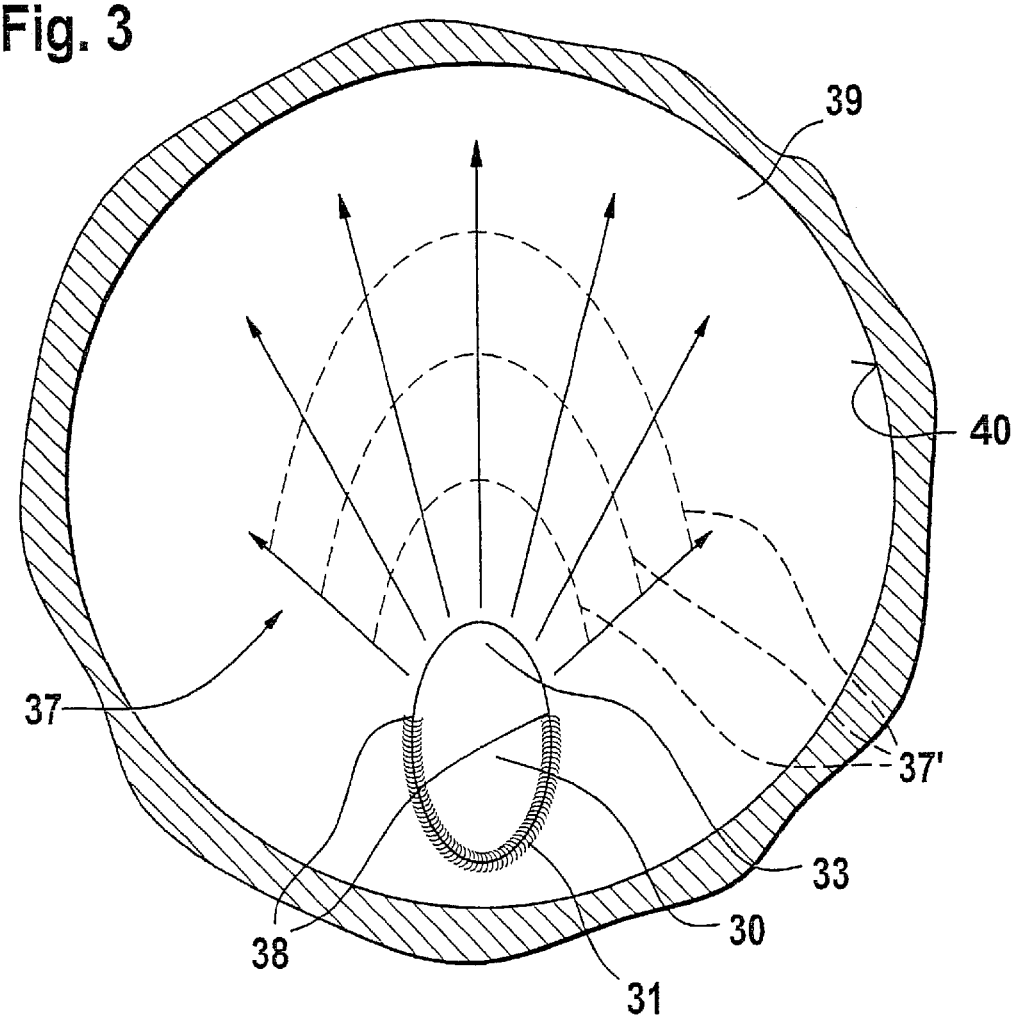
FIG. 3 shows an idealized representation of a jet fan able to be spray-discharged by the example embodiment of the fuel injector according to FIG. 1.

Slot-shaped flow outlet 35 makes it possible to produce a so-called fan-jet pattern 37 in the direct injection of fuel into a combustion chamber 39 of an internal combustion engine. Shown in FIG. 3, is a spray pattern that may be produced. Slot-shaped flow outlet 35 may ensure that the jet penetrates to varying degrees across the width of fan jet 37. In the central region of flow outlet 35, fan jet 37 emerges with the largest mass portion or the strongest jet penetration, while the penetration is lowest at the two slot ends 38. This produces fan-jet fronts 37' which penetrate combustion chamber 39 to varying depths. In this manner, the maximally available combustion chamber cross-section may be filled with fuel spray, without any significant wetting of the combustion-chamber wall 40. The maximum air quantity may be mixed with fuel spray, without any particular wall wetting.

Figure 4:
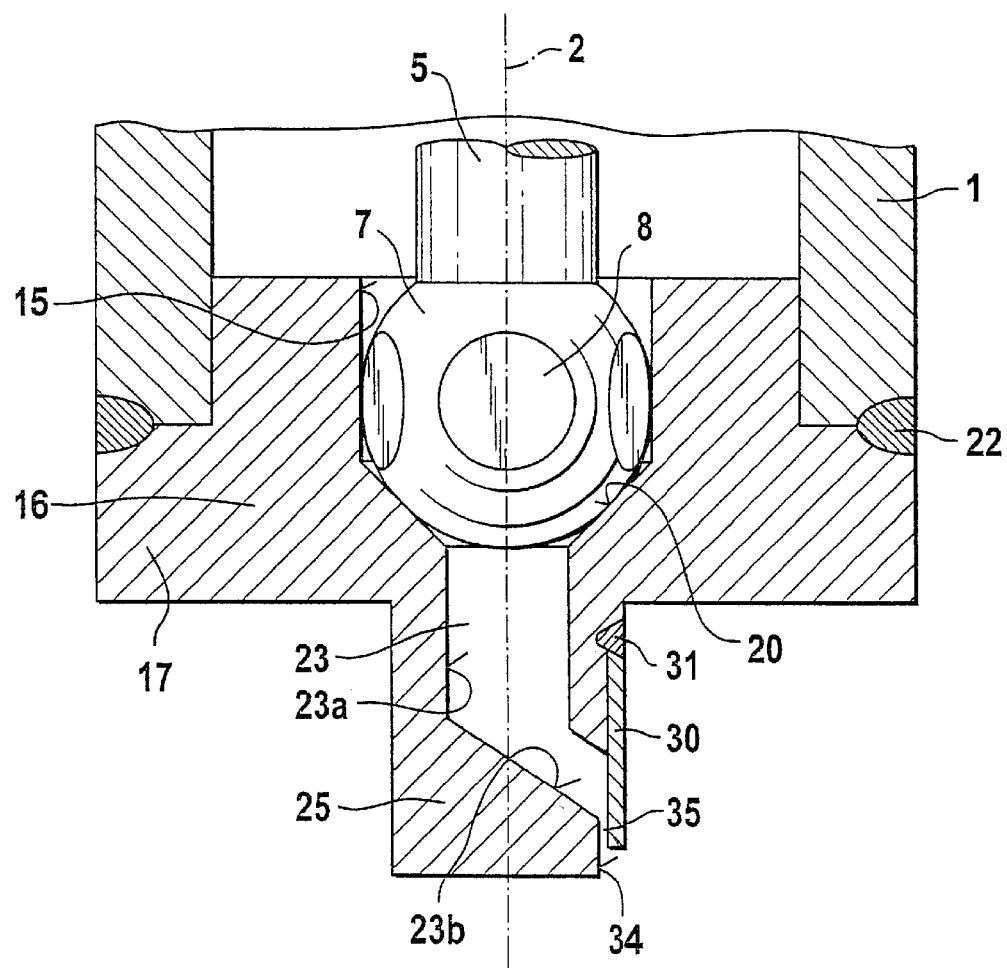
FIG. 4 shows a second example embodiment of a fuel injector, in the same view as FIG. 1.

FIG. 4 shows a second example of a fuel injector, in the same view as shown in FIG. 1. In this case, center spray-discharge area 25 upstream from valve seat 20 has a clearly projecting form. Outlet orifice 23 extends in two parts, a first section 23a running axially parallel, and a second section 23b forming an angle thereto, which, for example, encloses an angle of approx. 50 to 70° that includes longitudinal valve axis 2. Spray-discharge area 25 has a largely cylindrical shape with a lateral surface extending in parallel to longitudinal valve axis 2. Correspondingly, slot-forming element 30 likewise has an axially-parallel orientation and extends either in a curved manner in the circumferential direction or in a planar fashion at a flattened region of spray-discharge area 25. Due to the steep position of slot-forming element 30, fan jet 37 emerges largely paraxially from slot-shaped flow outlet 35.

Figure 5:
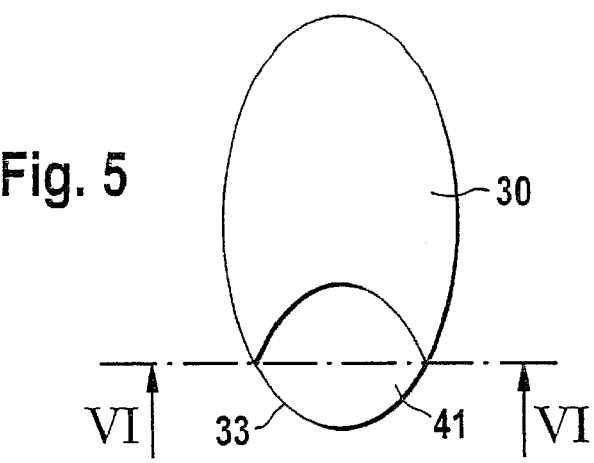
FIG. 5 shows a plan view of another slot-forming element.
Figure 6:
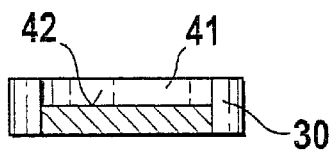
FIG. 6 shows a section along the line VI—VI in FIG. 5.

If, for strength reasons, a greater structural stiffness is required for slot-forming element 30, slot-forming element 30 may also be implemented with a greater thickness. However, in that case, the width of slot-shaped flow outlet 35 may no longer be adjusted by bending slot-forming element 30. It may then be necessary to obtain flow outlet 35 through a trough-shaped depression 41 formed at slot-forming element 30. FIG. 5 shows a plan view of the inflow side of such a slot-forming element 30 having a depression 41. Depression 41 may be implemented as a circle sector at free circumferential section 33 of slot-forming element 30, so that the opening angle of the circle sector specifies the propagation angle of fan-jet 37. The depression is made by stamping, for example. FIG. 6 shows a section along line VI—VI in FIG. 5. Depression 41 may extend over half of the thickness of slot-forming element 30, for example. Flow outlet 35 may be defined between depression bottom 42 of depression 41 and front face 34 of valve-seat member 16.

Figure 7:
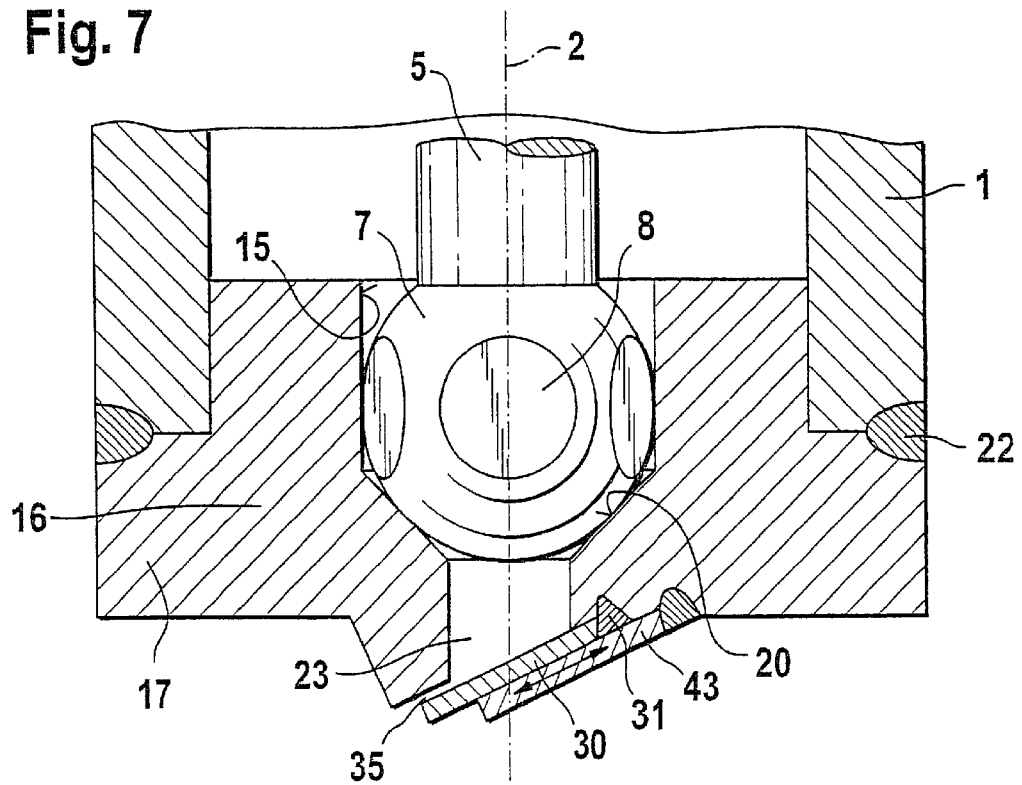
FIG. 7 shows a third example embodiment of a fuel injector in the same view as FIG. 1.

The stiffness of membrane-type slot-forming element 30 may also be increased by another measure, which is shown in FIG. 7. To increase the stiffness, a disk-shaped supporting element 43 may be mounted directly below slot-forming element 30. Support element 43 may only extends partially under slot-forming element 30. In the supported region, support element 43 prevents a bending of slot-forming element 30 due to pressure. However, in the non-supported region, slot-forming element 30 may still bend in a desired form. The flexural stiffness of slot-forming element 30 may be adjusted as desired in that the position of support element 43 prior to its fixation may be specified as variable.

What is claimed is:

1. A fuel injector for a fuel injection system of an internal combustion engine, comprising:
    an actuator disposed along a longitudinal valve axis;
    a stationary valve seat formed at a valve seat member;
    a movable valve part disposed along the longitudinal axis and cooperating with the stationary valve seat to open and close a valve;
    an outlet orifice formed downstream from the valve seat in the valve-seat member; and
    a slot-forming element disposed at a downstream end of the outlet orifice, the slot-forming member being configured to largely close the outlet orifice leaving open a slot-shaped flow outlet between the slot-forming element and a front face of the valve-seat member;
    wherein the slot-forming element is configured as a membrane-type element.

2. The fuel injector according to claim 1, wherein fuel injector is configured for direct injection of fuel into a combustion chamber of the internal combustion engine.

3. The fuel injector according to claim 1, wherein the slot-forming element is mounted directly on the valve-seat member.

4. The fuel injector according to claim 3, wherein the slot-forming element is secured by a welded seam, and the welded seam extends over 50 to 75% of an entire circumference of the slot-forming element.

5. The fuel injector according to claim 1, wherein a free circumferential section of the slot-forming element is disposed outside of the fastening region such that a flow outlet is formed between the slot-forming element and the front face of the valve-seat member.

6. The fuel injector according to claim 5, wherein the flow outlet is configured as a depression in the slot-forming element.

7. The fuel injector according to claim 1, wherein the flow outlet is disposed away from the longitudinal valve axis.

8. The fuel injector according to claim 1, wherein the slot-forming element is inclined at an angle.

9. The fuel injector according to claim 8, wherein the slot-forming element is positioned at an angle that deviates from the longitudinal valve axis by 90 degrees.

10. A fuel injector for a fuel injection system of an internal combustion engine, comprising:
an actuator disposed along a longitudinal valve axis;
a stationary valve seat formed at a valve seat member;
a movable valve part disposed along the longitudinal axis and cooperating with the stationary valve seat to open and close a valve;
an outlet orifice formed downstream from the valve seat in the valve-seat member; and
a slot-forming element disposed at a downstream end of the outlet orifice, the slot-forming member being configured to largely close the outlet orifice leaving open a slot-shaped flow outlet between the slot-forming element and a front face of the valve-seat member;
wherein the slot-forming element has an elliptical shape.

11. The fuel injector according to claim 10, wherein fuel injector is configured for direct injection of fuel into a combustion chamber of the internal combustion engine.

12. The fuel injector according to claim 10, wherein the slot-forming element is mounted directly on the valve-seat member.

13. The fuel injector according to claim 12, wherein the slot-forming element is secured by a welded seam, and the welded seam extends over 50 to 75% of an entire circumference of the slot-forming element.

14. The fuel injector according to claim 10, wherein a free circumferential section of the slot-forming element is disposed outside of the fastening region such that a flow outlet is formed between the slot-forming element and the front face of the valve-seat member.

15. The fuel injector according to claim 14, wherein the flow outlet is configured as a depression in the slot-forming element.

16. The fuel injector according to claim 10, wherein the flow outlet is disposed away from the longitudinal valve axis.

17. The fuel injector according to claim 10, wherein the slot-forming element is inclined at an angle.

18. The fuel injector according to claim 17, wherein the slot-forming element is positioned at an angle that deviates from the longitudinal valve axis by 90 degrees.

19. A fuel injector for a fuel injection system of an internal combustion engine, comprising:
an actuator disposed along a longitudinal valve axis;
a stationary valve seat formed at a valve seat member;
a movable valve part disposed along the longitudinal axis and cooperating with the stationary valve seat to open and close a valve;
an outlet orifice formed downstream from the valve seat in the valve-seat member; and
a slot-forming element disposed at a downstream end of the outlet orifice, the slot-forming member being configured to largely close the outlet orifice leaving open a slot-shaped flow outlet between the slot-forming element and a front face of the valve-seat member;
wherein the slot-forming element is plastically deformable during valve operation and the width of the flow outlet is configured to be variably adjustable.

20. The fuel injector according to claim 19, wherein fuel injector is configured for direct injection of fuel into a combustion chamber of the internal combustion engine.

21. The fuel injector according to claim 19, wherein the slot-forming element is mounted directly on the valve-seat member.

22. The fuel injector according to claim 21, wherein the slot-forming element is secured by a welded seam, and the welded seam extends over 50 to 75% of an entire circumference of the slot-forming element.

23. The fuel injector according to claim 19, wherein a free circumferential section of the slot-forming element is disposed outside of the fastening region such that a flow outlet is formed between the slot-forming element and the front face of the valve-seat member.

24. The fuel injector according to claim 23, wherein the flow outlet is configured as a depression in the slot-forming element.

25. The fuel injector according to claim 19, wherein the flow outlet is disposed away from the longitudinal valve axis.

26. The fuel injector according to claim 19, wherein the slot-forming element is inclined at an angle.

27. The fuel injector according to claim 26, wherein the slot-forming element is positioned at an angle that deviates from the longitudinal valve axis by 90 degrees.

28. A fuel injector for a fuel injection system of an internal combustion engine, comprising:
an actuator disposed along a longitudinal valve axis;
a stationary valve seat formed at a valve seat member;
a movable valve part disposed along the longitudinal axis and cooperating with the stationary valve seat to open and close a valve;
an outlet orifice formed downstream from the valve seat in the valve-seat member;
a slot-forming element disposed at a downstream end of the outlet orifice, the slot-forming member being configured to largely close the outlet orifice leaving open a slot-shaped flow outlet between the slot-forming element and a front face of the valve-seat member; and
a disk-shaped support element configured to be mounted directly below the slot-forming element and configured to increase a stiffness of the slot-forming element.

29. The fuel injector according to claim 28, wherein fuel injector is configured for direct injection of fuel into a combustion chamber of the internal combustion engine.

30. The fuel injector according to claim 28, wherein the slot-forming element is mounted directly on the valve-seat member.

31. The fuel injector according to claim 30, wherein the slot-forming element is secured by a welded seam, and the welded seam extends over 50 to 75% of an entire circumference of the slot-forming element.

32. The fuel injector according to claim 28, wherein a free circumferential section of the slot-forming element is disposed outside of the fastening region such that a flow outlet is formed between the slot-forming element and the front face of the valve-seat member.

33. The fuel injector according to claim 32, wherein the flow outlet is configured as a depression in the slot-forming element.

34. The fuel injector according to claim 28, wherein the flow outlet is disposed away from the longitudinal valve axis.

35. The fuel injector according to claim 28, wherein the slot-forming element is inclined at an angle.

36. The fuel injector according to claim 35, wherein the slot-forming element is positioned at an angle that deviates from the longitudinal valve axis by 90 degrees.

* * * * *